(12) United States Patent
Trestman

(10) Patent No.: US 6,680,585 B2
(45) Date of Patent: Jan. 20, 2004

(54) METHOD AND APPARATUS FOR MODULATING HID BALLAST OPERATING FREQUENCY USING DC BUS RIPPLE VOLTAGE

(75) Inventor: Grigoriy A. Trestman, Salem, MA (US)

(73) Assignee: Osram Sylvania Inc., Danvers, MA (US)

( * ) Notice: Subject to any disclaimer, the term of this patent is extended or adjusted under 35 U.S.C. 154(b) by 51 days.

(21) Appl. No.: 10/022,643

(22) Filed: Dec. 17, 2001

(65) Prior Publication Data
US 2003/0111968 A1 Jun. 19, 2003

(51) Int. Cl.[7] ............................................... H05B 41/36
(52) U.S. Cl. ................... 315/291; 315/224; 315/DIG. 7
(58) Field of Search ........................... 315/291, 200 R, 315/224, 225, 247, 276, 282, 283, 307, DIG. 2, DIG. 5, DIG. 7

(56) References Cited

U.S. PATENT DOCUMENTS

| | | | |
|---|---|---|---|
| 5,404,082 A | * | 4/1995 | Hernandez et al. ......... 315/219 |
| 5,864,212 A | * | 1/1999 | Sullivan ..................... 315/205 |
| 6,181,076 B1 | | 1/2001 | Trestman et al. ........... 315/224 |

* cited by examiner

Primary Examiner—Don Wong
Assistant Examiner—Thuy Vinh Tran
(74) Attorney, Agent, or Firm—Carlo S. Bessone

(57) ABSTRACT

An apparatus and method to implement an electronic ballast for a high intensity discharge lamp having AC lamp current centered at approximately 300 kHz minimizes the ballast cost and utilizes modulation of the lamp current to avoid acoustic resonance. In order to minimize the number of additional components providing the modulation function, the ripple voltage produced by PFC circuit is fed through a capacitor to a FREQUENCY SET input of an inverter controller. The value of the capacitor can be chosen to produce the desired modulation range.

17 Claims, 4 Drawing Sheets

METHOD AND APPARATUS FOR MODULATING HID BALLAST OPERATING FREQUENCY USING DC BUS RIPPLE VOLTAGE

TECHNICAL FIELD

The invention relates to an apparatus for and a method of providing controlled modulation of the high frequency AC current of a high-intensity discharge (HID) lamp. Specifically, the low frequency ripple voltage remaining on the DC bus voltage after its conversion from an AC line is utilized as a modulation input signal to a controller, which adjusts the switching frequency of the inverter.

BACKGROUND ART

The electronic ballast is one of the most cost sensitive products of power electronics. Its cost is a major factor constraining market penetration of electronic ballasts for HID lamps.

One possible solution to this problem is to utilize a high frequency HID electronic ballast such as that described in U.S. Pat. No. 6,181,076 issued to Trestman et al. High frequency electronic ballasts cost less than corresponding low frequency electronic ballasts because the high frequency ballasts includes fewer parts. This is due to the fact that at higher operating frequencies it is possible to use resonant ignition, thereby eliminating a separate igniter circuit. Additionally, the increase in operating frequency is accompanied by a corresponding decrease in the physical size and cost of the ballast, because the reactive components such as capacitors and inductors are both smaller and less expensive.

This general relationship is true only up to a point, however, because above a certain frequency the cost of the ballast begins to increase with increased frequency. There are several reasons for this:

One of the most significant factors determining ballast cost is the cost of the controller and the driver for the switch or switches of the inverter. These switches are most often implemented as field effect transistors (FETs). At present, there are several inexpensive electronic ballast control ICs. Such devices integrate a half bridge inverter controller with low side and high side FET drivers, a startup circuit, and a fault protection logic circuit. One example of such a device is the ST Microelectronics L6574.

Other electronic ballast control ICs also include a power factor correction (PFC) controller with a PFC FET driver. Examples of such a device are the ST Microelectronics L6570 and the International Rectifier IR2167. These control ICs can operate at frequencies up to 350 kHz. In order to achieve higher operating frequencies, it is necessary to use special much more expensive high frequency controllers and separate high frequency FET drivers, both of which contribute to increased overall cost.

The common inexpensive FETs have a comparatively slow body diode. Above an operating frequency of approximately 400 kHz, losses in such diode became unacceptably high. As a result, in order to operate the ballast at these higher frequencies, either two high frequency diodes should be added for each transistor, or specially designed, and hence more expensive, FETs with fast body diode should be used.

As an additional factor, when operating frequencies are above 350 kHz it is necessary to use more expensive ferrite core materials and more expensive Litz wire for the magnetic components.

FIG. 1 is a graph illustrating ballast cost as a function of operating frequency reflecting the points considered above. As illustrated therein, minimum cost is achieved at a frequency of approximately 300 kHz.

A further consideration which must be borne in mind in lamp and ballast design is the wide spectrum of standing acoustic waves.

The acoustic spectrum for a Sylvania MPD39PAR30LN/U/830/FL 39W HID metal halide lamp is illustrated in FIG. 2. Each peak corresponds to a certain standing acoustic wave in the discharge vessel—a resonant component of the acoustic spectrum. The magnitude of the resonance component represents it strength. The stronger a component, the less damped it is and therefore the more easily it could be established and sustained. It is very difficult to stabilize an arc in an area with the presence of strong resonance.

As the size of a lamp burner decreases, its acoustic spectrum widens. For example, the acoustic spectrum of a 70W HID lamp with a quartz burner does not contain harmonics above 150 kHz, and the arc is stable if the lamp is driven by a 300 kHz ballast. As seen from the acoustic spectrum of a 39W lamp with a ceramic burner illustrated in FIG. 2, there are harmonics with a small magnitude (weak harmonics) in the area of 300 kHz. If one were to use a 300 kHz ballast to drive such a lamp, acoustic waves would arise and as a result the arc would not be stable.

One known method of arc stabilization utilizes frequency modulation of the AC current. It has been determined through experimentation that such modulation reliably stabilizes the arc in the range of weak resonance.

There exist a number of patents related to ballasts operating at high frequency with frequency modulation. Example circuits are described in U.S. Pat. No. 5,680,015 issued to Bernitz at al. and U.S. Pat. No. 5,859,505 issued to Bergman at al. In the circuits described by these patents, the ballast includes such highly complex electronic components such as microprocessors, analog-to-digital (A/D) converters, etc. These circuits are designed to detect arc instabilities, store date in the microprocessor memory, calculate a stability factor and adjust the operating frequency so as to work at a frequency with minimized arc instability. This complex circuitry significantly increases the cost of ballast.

Another prior art reference is U.S. Pat. No. 5,923,128 issued to Canoga. The circuit includes a triangular current wave generator specifically added to the ballast to provide a triangular waveform that modulates the frequency of the switching signal controlling the inverter. The ballast described by this patent is intended to operate at a frequency of approximately 20 kHz.

DISCLOSURE OF THE INVENTION

The present invention provides an electronic ballast for operating a high intensity gas discharge (HID) lamp from an AC line. The electronic ballast includes an EMI filter, a bridge rectifier, a power factor corrector (PFC), an inverter and an inverter controller. The inverter circuit provides the HID lamp with AC current within a frequency range of 250–350 kHz.

There exist a number of inexpensive components including field effect transistors (FETs), controller chips with built-in high side and low side FET drivers, ferrite cores, etc., that are designed to operate in this frequency range. Use of these components minimizes the cost of the ballast.

In the frequency range of 250–350 kHz, acoustic resonance harmonics in the lamp are either absent, as in the case of HID lamps with large burners, or their magnitudes are small, as in the case of HID lamps with small burners. The electronic ballast of the present invention provides frequency modulation of the output AC current such that deleterious effects of the lamp's acoustic resonance are eliminated.

To simplify the circuitry, voltage ripple on the bulk capacitor of the PFC output (DC bus) is used for frequency modulation. The modulation range of the switching frequency is determined by choosing the value of a small capacitor connected between the positive electrode of the bulk capacitor and a frequency set pin of the inverter controller. With such an arrangement, the only additional circuit component is a small capacitor, which results in virtually no increase in the cost of the ballast.

The ballast of the present invention is designed to operate at a frequency in the area of 300 kHz, where the cost of a ballast is minimal, as illustrated in FIG. 1. In this frequency range, the magnitude of acoustic waves, even in the case of a lamp with a small burner, are small and can be suppressed by frequency modulation of the lamp current.

To achieve frequency modulation of the lamp current, the present invention makes use of the voltage ripple on the DC bus (120 Hz in the case of a 60 Hz line frequency) to supply the modulating signal.

To convert the AC ripple voltage to AC current, the disclosed ballast utilizes the impedance of an additional capacitor connected between DC bus and the Freq. Set pin of the inverter controller. The total current flowing into the Freq. Set pin is the sum of the current flowing through this capacitor and the frequency set current, the combination of which provides low frequency modulation (e.g. 120 Hz) of the high frequency signal (e.g. 300 kHz) of an oscillator internal to the inverter controller. The capacitor connected between DC bus and the Freq. Set pin also serves a DC blocking function.

It is an object of present invention is to provide a much simpler and less expensive circuit for HID lamp current modulation.

Another object of the present invention is to provide an apparatus and method to utilize the existing AC ripple on the DC bus voltage as a modulating signal.

It is a further object of the present invention to provide a method and apparatus to connect DC bus voltage having an AC ripple to a frequency set input of an inverter controller in a ballast.

It is yet another object of the present invention to provide a method and apparatus to connect a DC bus voltage with low frequency ripple voltage to a frequency set input of an inverter controller through a reactive component.

It is yet a further object of the present invention to provide a low-cost ballast circuit operating at a switching frequency outside of regions of strong resonance.

BRIEF DESCRIPTION OF THE DRAWINGS

The present invention will be described with reference to the following drawing figures in which.

MODE FOR CARRYING OUT THE INVENTION

Figure 1:
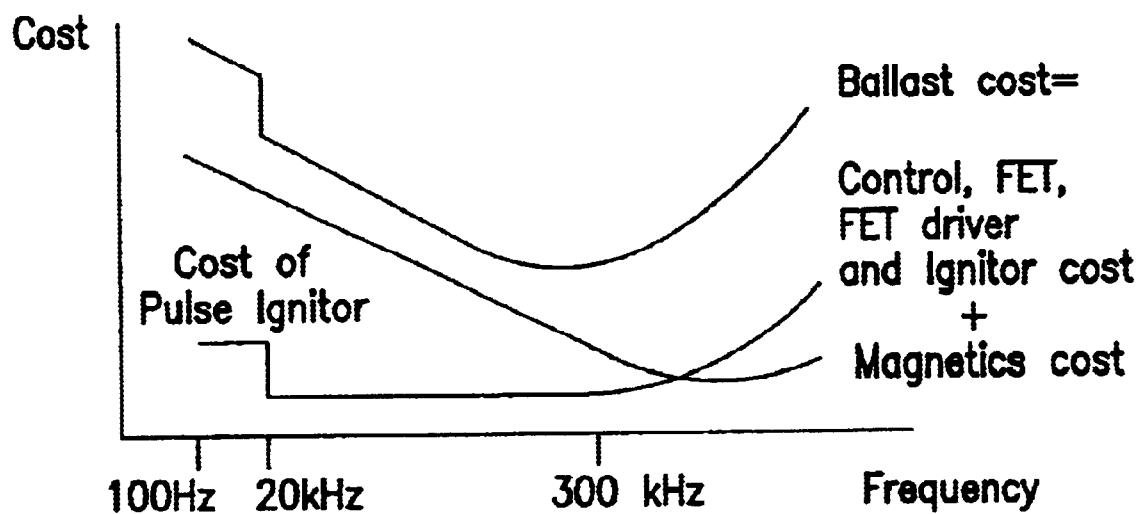
FIG. 1 is a graphical representation of cost as a function of frequency for an electronic ballast.
Figure 2:
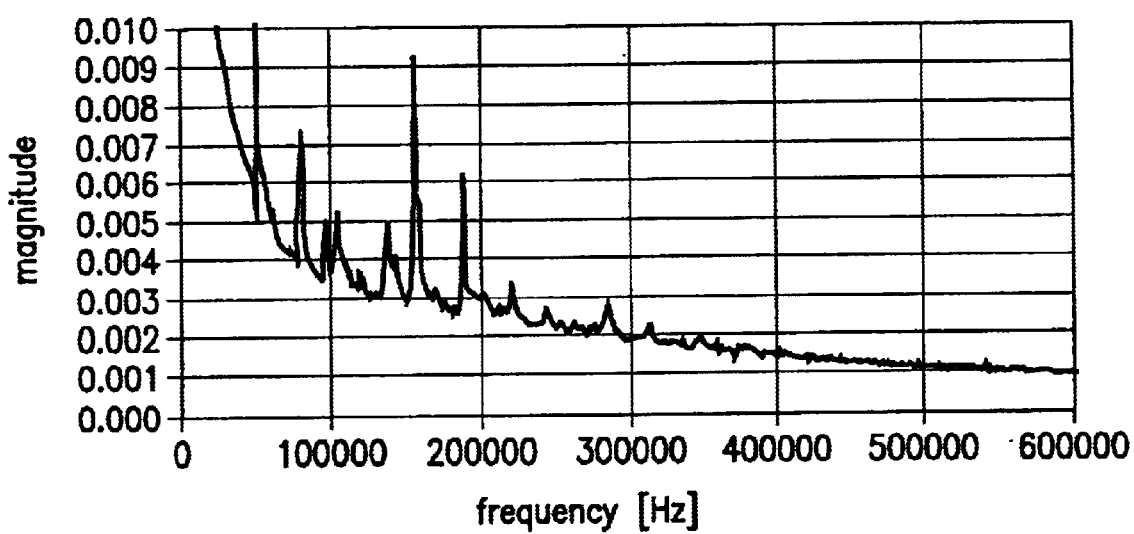
FIG. 2 is an acoustic spectrum of a 39 W metal halide lamp.
Figure 3:
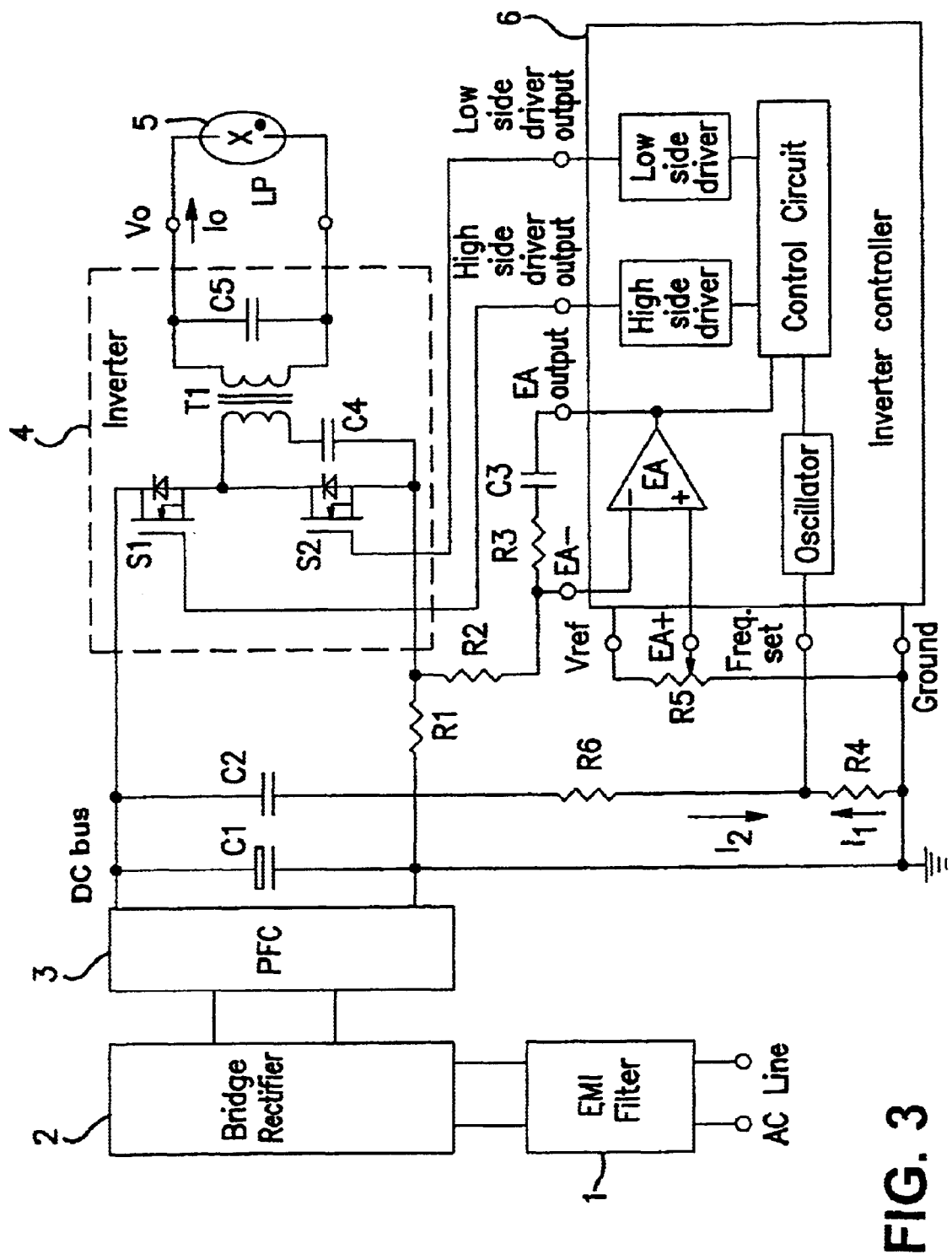
FIG. 3 is a schematic illustration of an electronic ballast in accordance with the present invention.

FIG. 3 illustrates a circuit designed to operate an HID lamp 5 by providing power to the lamp 5 from a power source through an inverter circuit 4 which has at least one inverter control input, wherein the inverter circuit 4 operates at high frequency. Inverter 4 as illustrated includes switches S1 and S2 implemented as FETs connected source-to-drain, with their gates connected to the high and low side driver outputs, respectively. The source of S1 is connected to the drain of S2 as well as a first terminal of a primary winding of transformer T1. A second terminal of the primary winding is connected through a capacitor C4 to the source of S2. A capacitor C5 is connected across the secondary winding of transformer T1 in parallel with lamp 5. The source of FET S2 is connected through resistor R1 to the negative terminal of DC bus. The drain of FET S1 is connected to the positive terminal of DC bus. Bulk capacitor C1 is connected across DC bus.

The HID lamp electronic ballast is powered by an AC line. The ballast controls the electrical power supplied to the gas discharge lamp 5, providing the voltage and current required for both ignition as well as steady state operation of the lamp 5. EMI Line filter 1 receives the AC line input, reduces conducted interference and provides its output to bridge rectifier 2. Bridge rectifier 2 provides a rectified sinusoid output to power factor correction (PFC) converter 3. PFC converter 3 reduces line harmonic distortion and generates constant DC bus voltage. DC bus voltage is applied to full bridge inverter 4.

Driven by the signals from the high side and low side FET drivers of inverter controller 6, inverter 4 generates high frequency (~300 kHz) AC current. Capacitor C5 and the leakage inductance of transformer T1 form a resonant tank. It resonates with the inverter frequency at start up and develops high voltage, igniting the HID lamp 5.

Inverter controller 6 has a pin EA output connected through a capacitor C3 and resistors R3 and R2 to the source of FET S2. Pin EA− of inverter controller 6 is connected between resistors R2 and R3. Pin EA+ of inverter controller 6 is connected to a wiper of a variable resistor R5, the other terminals of which are connected to pin Vref of inverter controller 6 and ground. Within the inverter controller 6, pins EA− and EA+ are connected to the negative and positive terminals, respectively, of error amplifier EA, the output of which is connected to EA output, fed back to the EA− pin through the capacitor C3 and the resistor R3, as discussed above. The output of the error amplifier is also connected to an input of a control circuit within inverter controller 6.

During steady state operation a voltage signal from current sense element R1 is compared to a predetermined set voltage as determined by position of the potentiometer wiper of variable resistor R5 connected to the EA+ input of the Error Amplifier, and the resulting control loop keeps the inverter input current constant. Due to constant voltage on the inverter input and constant efficiency, power consumption by the lamp also stays constant with sufficient accuracy.

The inverter controller 6 also includes an oscillator, an output of which is connected as an input of the control circuit, with an input of the oscillator being connected to a Freq. Set pin of inverter controller 6. The Freq. Set pin is connected to ground through resistor R4. The internal oscillator inside the inverter controller 6 generates a high frequency signal, which in turn controls the high and low side drivers through the control circuit. The frequency of the oscillator output depends on the current I1 flowing from the ground to the Freq. Set pin through resistor R4.

To provide frequency modulation of lamp current, the present invention applies low frequency (120 Hz) current I2 to the Freq. Set pin. The current I2 is provided through capacitor C2 connected between DC bus and the Freq. Set pin of the controller 6. Capacitor C2 is used in the illustrated circuit to perform two separate functions, namely converting DC bus ripple voltage to the low frequency (120 Hz) current I2, as well as preventing high (450V) voltage DC bus from appearing at the Freq. Set pin. At the Freq. Set pin the current I2 is summed with the frequency set current I1, thereby providing low frequency modulation of high frequency signal of internal oscillator. Increasing the value of capacitor C2 widens the modulation range.

It has been determined through experimentation that in many situations it is sufficient to have +10% modulation (300 kHz±30 kHz) to effectively suppress acoustic resonance in the area of weak resonance. Additional resistor R6 serves to protect the Freq. Set input of controller 6 from inrush current during start up.

To facilitate a more thorough understanding of the present invention it is worthwhile to consider a practical example, namely an electronic ballast built according to circuit diagram FIG. 3 utilizing a L6574 Inverter controller driving a Sylvania MPD39PAR30LN/U/830/FL 39W HID Lamp. In this case, C1 is a 10 uF electrolytic capacitor. We will calculate the value of capacitor C2 required to achieve a modulation of ±10%.

Figure 4:
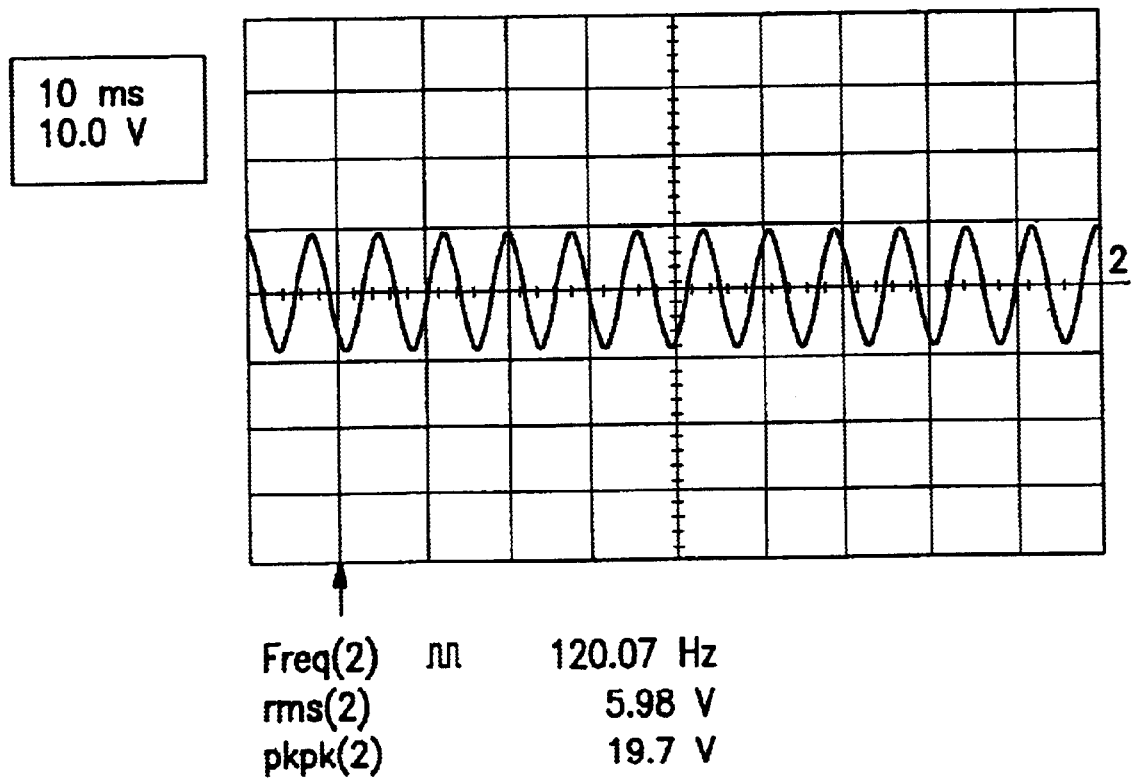
FIG. 4 is an illustration of a typical AC ripple waveform.

The voltage ripple across the 10 uF capacitor C1 in the 39W ballast is illustrated in FIG. 4. It has a nearly sinusoidal shape with a frequency of the rectified AC line (Fr) of 120 Hz, an RMS voltage ($V_{RMS}$) of 6V, and a peak-to-peak voltage ($V_{p-p}$) of 19.7V.

In the case of L6574 controller, voltage on the Freq. Set pin is $V_{set}$=2V. In order to achieve an operating frequency of 300 kHz, resistor R4 should have a value of 20 kΩ. Current through resistor R4 can be calculated as follows:

$$I1 = \frac{V_{set}}{R4}.$$

Because ripple voltage on the bulk capacitor is close to a sinusoidal shape, impedance of capacitor C2 is:

$$X_{C2} = \frac{1}{2\Pi \cdot Fr \cdot C2}; \text{ and}$$

RMS current through C2 is:

$$I2_{RMS} = \frac{V_{RMS}}{X_{C2}} = V_{RMS} \cdot 2\Pi \cdot Fr \cdot C2; \quad \text{(Equation 1)}$$

To have 10% frequency modulation, peak current $I2_{pk}$ should be:

$$I2_{pk} = 0.1 \cdot I1 \quad \text{(Equation 2)}$$

At the same time:

$$I2_{pk} = I2_{RMS}\sqrt{2} \quad \text{(Equation 3)}$$

By combining Equations 1, 2, and 3, and we can arrive at a value for capacitor C2:

$$C2 = \frac{0.1 \cdot I1}{\sqrt{2} \cdot V_{RMS} \cdot 2\Pi \cdot Fr} = 470 \text{ pf.}$$

Application of the present invention is not limited to HID lamp driving. Frequency modulation of the switching frequency of an inverter is also used as a method of noise reduction in DC power supplies, and the present invention may be adapted for such use.

While the present invention has been described in detail in connection with particular embodiments, these are not to be construed in any way as limitations of the invention, the full extent of which is described by the attached claims.

I claim:
1. A ballast circuit comprising:
   a DC power source producing a DC bus voltage having an AC ripple component;
   an inverter circuit electrically connected to the DC bus voltage, the inverter circuit comprising at least one switch;
   an inverter controller having a driver output electrically connected to said at least one switch, the inverter controller having a frequency set input;
   wherein the frequency set input of the inverter controller is connected to a positive terminal of the DC bus voltage through a capacitor.
2. The ballast circuit of claim 1, further comprising a first resistor connected in series with the capacitor between the positive terminal of the DC bus voltage and the frequency set input of the inverter controller.
3. The ballast circuit of claim 2, further comprising a second resistor connected between electrical ground and the frequency set input of the inverter controller.
4. The ballast circuit of claim 3, wherein the inverter controller comprises:
   a driver circuit electrically connected to said driver output, said driver circuit having an input;
   a control circuit having an output connected to the input of said driver circuit, the control circuit having a first input;
   an oscillator having an output connected to the first input of the control circuit, the oscillator having an input connected to the frequency set input of the inverter controller.
5. The ballast circuit of claim 4, wherein the inverter controller further comprises an error amplifier circuit having an output connected to a second input of the control circuit, the error amplifier circuit having a first input connected through a first error amplifier resistor to the electrical ground and a second input connected through a second error amplifier resistor to the DC bus voltage.
6. The ballast circuit of claim 5, wherein the ballast circuit is constructed so that a switching frequency of the at least one switch is modulated within a range of 250 kHz to 350 kHz.
7. The ballast circuit of claim 1, wherein the ballast circuit is constructed so that a switching frequency of the at least one switch is modulated within a range of 250 kHz to 350 kHz.
8. The ballast circuit of claim 7, wherein the ballast circuit is constructed so that a switching frequency of the at least one switch is modulated within a range of 270 kHz to 330 kHz.

9. The ballast circuit of claim 7, further comprising a first resistor connected in series with the capacitor between the positive terminal of the DC bus voltage and the frequency set input of the inverter controller.

10. The ballast circuit of claim 9, further comprising a second resistor connected between electrical ground and the frequency set input of the inverter controller.

11. A method of operating a lamp ballast circuit comprising:

a DC power source producing a DC bus voltage having an AC ripple component;

an inverter circuit electrically connected to the DC bus voltage, the inverter circuit comprising at least one switch; and an inverter controller having a driver output electrically connected to said at least one switch, the inverter controller having a frequency set input;

the method comprising the steps of:

providing an electrical connection between the DC bus voltage and the frequency set input of the inverter controller;

using the electrical connection between the DC bus voltage and the frequency set input to modulate a switching frequency at which the inverter controller enables the at least one switch.

12. The method of claim 11, wherein a frequency of the modulation is a frequency of the AC ripple component.

13. The method of claim 12, wherein a center frequency of the modulated switching frequency is approximately 300 kHz.

14. The method of claim 12, wherein the switching frequency is modulated within a range of 250 kHz to 350 kHz.

15. The method of claim 12, wherein the switching frequency is modulated within a range of 270 kHz to 330 kHz.

16. The method of claim 12, wherein the electrical connection between the DC bus voltage and the frequency set input comprises a capacitor.

17. The method of claim 16, wherein the electrical connection between the DC bus voltage and the frequency set input further comprises a resistor.

* * * * *